Nov. 7, 1961    J. W. SCHAEFER    3,007,344
TIGHTENING AND CUSHIONING DEVICE FOR ENDLESS DRIVEN MEMBERS
Filed Dec. 31, 1959    2 Sheets-Sheet 1
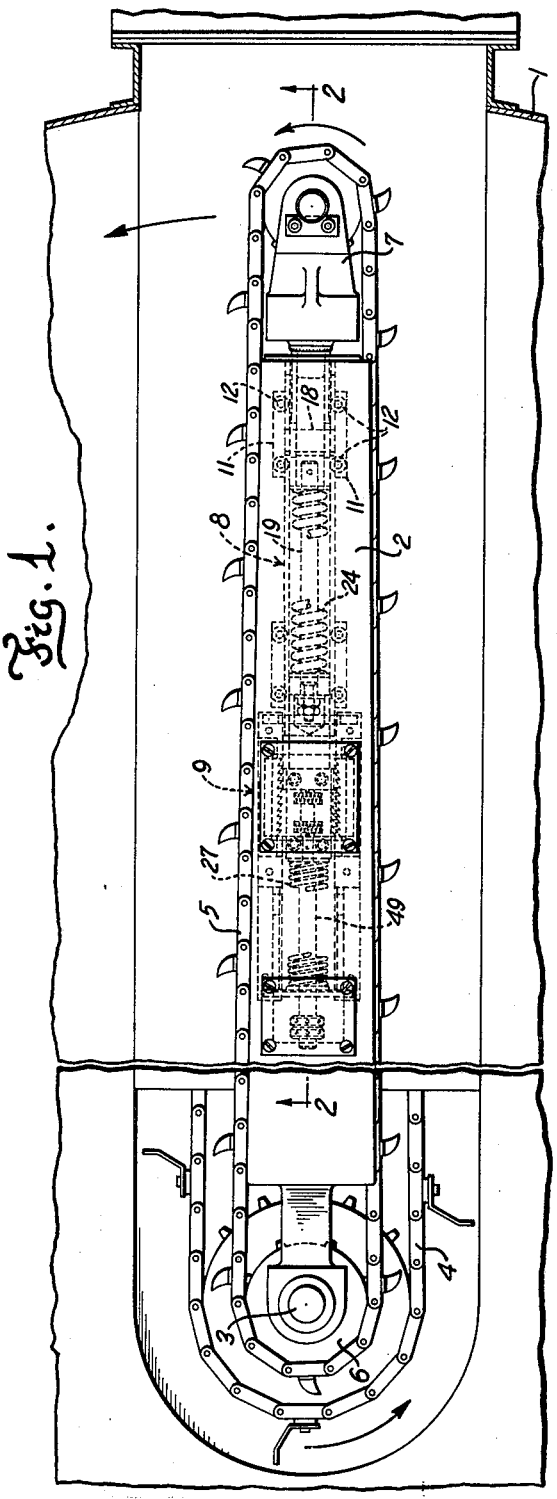
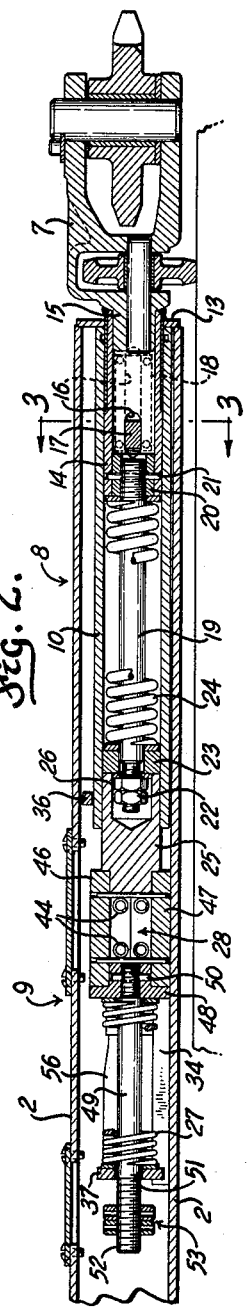
INVENTOR.
John W. Schaefer
BY
Andrus & Starke
Attorneys

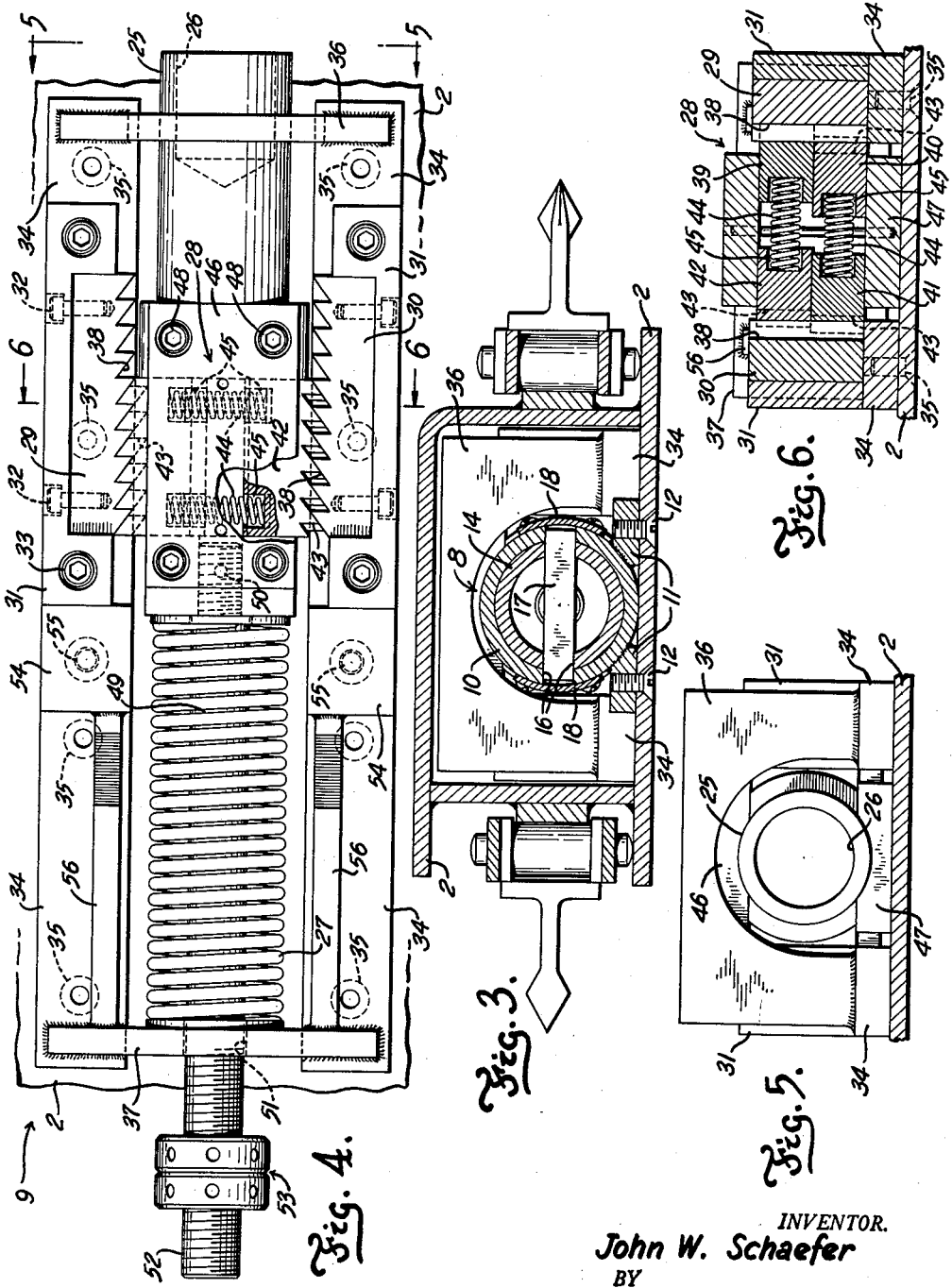

ns in the cushion means.
In accordance with another aspect of the present invention, the ratchet assembly includes a pair of spaced stationary ratchet racks having similar ratchet teeth in spaced faced relation. A series of individual ratchet sectors are supported by a cage between the ratchet racks for simultaneous movement and are biased outwardly into engagement with the racks. The sectors include teeth relatively shifted with respect to the teeth of each of the other sectors generally in accordance with the length of the pitch of each of the teeth divided by the number of sectors. Consequently, the sectors successively fall into full engagement with the teeth on the rack and successively constitute the locking members preventing rearward movement of ratchet sectors. This arrangement allows the tooth pitch and depth to be selected to provide the required backup strength with a very small movement between successive locking positions.

United States Patent Office 3,007,344
Patented Nov. 7, 1961

3,007,344
TIGHTENING AND CUSHIONING DEVICE FOR ENDLESS DRIVEN MEMBERS
John W. Schaefer, Kankakee, Ill., assignor to A. O. Smith Corporation, Milwaukee, Wis., a corporation of New York
Filed Dec. 31, 1959, Ser. No. 863,302
10 Claims. (Cl. 74—242.14)

This invention relates to a tightening and cushioning device for an endless driven member and is particularly directed to a resiliently mounted ratchet follower for constantly maintaining endless chains and the like in a taut condition with a simple, reliable and durable assembly.

The tensioning and cushioning device of the present invention is particularly adapted for use in connection with a bottom silo loader such as shown in U.S. Patents 2,702,485 to R. J. Nadherny and 2,764,031 to A. F. Nystrom. These patents disclose a silo-type storage structure having a radial cutter arm centrally mounted in the floor for rotation within the storage structure. The arm carries an endless chain having suitable laterally projecting cutters which are adapted to cut into the stored material and discharge it into a discharge hopper.

The Nystrom patent particularly notes the importance of keeping the chain taut and provides an expandable cutter arm to compensate for wear or the like. A cushion spring is also provided to allow limited reciprocation of the chain carrier to absorb chordal and other shock forces arising during the operation of the unit. Nystrom establishes a movable stop actuated by a torsion spring and screw for the cushion spring to maintain a controlled recoil.

Although prior art apparatus provides a highly workable structure, manufacturing and servicing is not readily adapted to commercial practice.

The present invention is directed to a readily fabricated and long life tensioning and cushioning assembly which requires a very minimum of maintenance and service. This is important because the assembly must provide reliable unloading of the stored structures and cannot be readily serviced directly by the user or owner of the structure.

Generally, in accordance with the present invention, the chain carrier is supported as the movable component of an expandable housing assembly. The end opposite the chain carrier is supported against linear movement. A cushioning and tensioning unit includes an interrelated tension means and cushion means and is mounted within the housing to continuously and resiliently bias the chain carrier outwardly and thereby maintains the chain taut and absorbs chordal and other shock forces.

The cushioning and tensioning unit of the present invention includes a one-way ratchet assembly as a stop or backing member for the cushion means which is interposed between the movable component of the ratchet assembly and the chain carrier. The movable component of the ratchet assembly is biased to the outward direction by the resilient tension means. The cushion means has a greater force than the resilient tension means and consequently, so long as the cushion means is operative the ratchet merely acts as an inward stop. However, after the cushion means is no longer effective, the lighter force of the tension means can come into play to force the carrier outwardly to take up the slack in the chain. The one-way ratchet assembly isolates excessive recoil forces occasioned by the chain working process and maintains a controlled recoil in the cushion means.

The present invention provides a very simply manufactured and maintained assembly which positively functions to maintain an endless member in a taut condition.

The drawings furnished herewith illustrate the best mode presently contemplated for carrying out the invention.

In the drawings:

FIG. 1 is a top elevational view of a cutter arm for a silo or similar unloader constructed in accordance with the present invention;

FIG. 2 is a view taken on line 2—2 of FIG 1;

FIG. 3 is an enlarged vertical section taken on line 3—3 of FIG. 2;

FIG. 4 is an enlarged plan view of the ratchet assembly shown in FIGS 1 and 2;

FIG. 5 is an end view of FIG. 4 taken on the line 5—5 of FIG. 4; and

FIG. 6 is a vertical section taken on the line 6—6 of FIG. 4.

Referring to the drawings, and particularly to FIG. 1, an unloader construction is shown in accordance with the present invention for use in a storage structure 1, of which only a fragmentary portion is shown. The unloader construction generally includes a cutter arm 2 which is secured at one end to a central bearing hub 3 located centrally of the storage structure 1. A chain 4 is rotatably mounted beneath the hub 3 and coupled to a drive, not shown, to rotate the hub and the attached arm 2 about the vertical axis of the hub to continuously sweep across the bottom of the structure 1. A conventional endless chain 5, formed of a series of rigidly and pivotally interconnected links, encircles the cutter arm 2 and is driven by a sprocket 6 on hub 3 to move about arm 2.

The cutter arm 2 of the present invention is generally similar to that shown and described in the previously referred to patents to Nadherny and Nystrom. Suitable cutter teeth are secured to the chain in any suitable manner and extend horizontally of arm 2 to engage and dislodge silage or other material, not shown, which is stored within the storage structure 1. A movable fork 7 is secured to the outer end of arm 2 to support and carry the adjacent portion of the chain 5 as it circles the cutter arm 2.

Referring particularly to FIGS. 1 and 2, the present invention includes a cushioning assembly 8 and a takeup or tensioning assembly 9 mounted within the outer end of cutter arm 2 and continuously biasing the fork 7 outwardly. The cushioning assembly 8 is secured in the outermost end of the arm 2 and is adapted to establish a controlled and constant recoil for shock loads which arise due to chordal action of the chain and the like. The tensioning assembly 9 is secured within the arm 2 adjacent assembly 8 and is adapted to take up any slack in the chain 5 which may arise as a result of wear and the like and to thereby maintain the chain in a taut condition.

As most clearly shown in FIGS. 2 and 3, the cushioning assembly 8 generally includes a cylindrical housing 10 which is supported within the cutter 2 in alignment with a central opening in the outer end of the arm. Suitable mounting members 11 are welded or otherwise secured to the underside of housing 10 and are secured to the lower wall of the arm 2 by cap screws 12 to rigidly attach housing 10 within cutter arm 2. The outer end of the arm 2 is closed by an end closure wall 13 which is apertured in alignment with the housing 10 to receive a hollow tubular piston 14. The fork 7 includes a tubular shaft 15 which projects into piston 14 and is welded or otherwise secured therein to slidably support the fork 7 for radial movement with piston 14.

The tubular piston 14 is interlocked to housing 10 to prevent rotation of the piston about its own axis in order to maintain the horizontal positioning of the fork 7 and the chain 5, as follows. The piston 14 and housing 10 are provided with aligned axially extending slots 16 in diametrically opposite wall portions. A key 17 spans the piston 14 and housing 10 and projects into the slots 16 to interconnect the piston 14 to housing 10. Retaining plates 18 overlie the slots 16 and are bolted or otherwise secured to the housing 10 to lock the key 17 in the slots 16. Key 17 prevents rotation of the piston 14 and the attached fork 7 with respect to the housing 10 and thus with respect to the horizontal axis. The slots 16 in the housing 10 are however extended axially of housing 10 and piston 14 to allow reciprocation of the piston 14 within the housing 10 and to allow forward movement of the piston 14 outwardly of arm 2, as subsequently described.

A shaft 19 is secured within the inner end of the piston 14 by threaded bushing 20 which is welded or otherwise secured within the innermost end of the piston. The shaft 19 is thereby rigidly interlocked to piston 14 for simultaneous movement. A pin 21 extends through aligned opening in the bushing 20 and the shaft 19 to prevent unthreading of the shaft 19.

The shaft 19 projects rearwardly within the housing 10 and terminates in a threaded end portion which is adapted to receive a pair of locked nuts 22. A bearing collar 23 having a diameter corresponding to the inner diameter of housing 10 is secured on the adjacent end of shaft 19 by the lock nuts 22. A helical compression spring 24 encircles shaft 19 within housing 10 and is constrained between the collar 23 and the inner end of the piston 14. A pressure bar 25 which constitutes a part of the tensioning assembly 9 terminates in a forward tubular end 26 which projects into housing 10 and which encircles the adjacent end of shaft 19 and the lock nuts 22.

The tubular end 26 of bar 25 engages the collar 23 and limits the inward positioning of collar 23 to thus establish collar 23 as a stop for spring 24.

The collar 23 is suitably positioned on shaft 19 by actuation of nuts 22 to compress the spring and allow only limited movement of shaft 19 and the attached piston 14 incident to corresponding movement of the fork 7. As chordal forces and the like are exerted upon the fork 7, the spring 24 compresses and absorbs the forces. As the forces are removed, the spring 24 forces the fork 7 outwardly and thus maintains the chain taut. The spring 24 thus acts as a cushion and isolates abnormal shock forces.

The tensioning assembly 9 constitutes a movable stop for the cushioning assembly 8 and prevents movement of the cushioning assembly 8 as a unit within housing 10.

The tensioning assembly 9 generally includes a tensioning spring 27 which is coupled to pressure bar 25 by a ratchet assembly 28. The spring 27 continuously biases the bar 25 toward the collar 23. Consequently, if the chain 5 lengthens and the limited outward movement of spring 24 cannot force the fork 7 into engagement with chain 5, the force of spring 27 acts upon collar 23 to move the cushioning assembly 8 outwardly and thereby forces the fork 7 into engagement with chain 5. The spring 27 is weaker than spring 24 and consequently does not come into play until such time as the spring 24 is completely expanded and the chain 5 is still removed radially of the fork 7.

The inward forces on fork 7 are essentially isolated from spring 27 by the ratchet assembly 28.

Referring particularly to FIGS 4-6, the ratchet assembly 28 includes opposed stationary ratchet racks 29 and 30 which are rigidly secured in laterally spaced relation to the lower wall of the cutter arm 2. Each ratchet rack 29 and 30 is secured within a recessed mounting block 31 by bolts 32. Locking bolts 33 extend downwardly through the blocks 31 and thread into aligned tapped openings in a pair of frame plates 34. The frame plates 34 are secured to the cutter arm 2 by suitable locking screws 35 and the ratchet racks 29 and 30 are thus locked against movement with respect to the cutter arm. Forward and rearward end braces 36 and 37 span the adjacent ends of the frame plates 34 to form ratchet rack subassembly with the ratchet racks 29 and 30 accurately spaced.

Each of the racks 29 and 30 include triangularly shaped ratchet teeth 38 arranged in facing and aligned relationship as shown in FIG. 4. Four ratchet sectors 39-42 are slidably mounted between the ratchet racks 29 and 30 and have ratchet teeth 43 mating with the teeth 38 of the racks 29 and 30. The ratchet sectors 39-42 are mounted in side-by-side stacked pairs, as most clearly shown in FIG. 6. Suitable coil springs 44 are disposed between the opposed ratchet sectors 39-42 and bias them laterally into mating engagement with the ratchet racks 29 and 30. Tubular recesses 45 are provided in the back side of the sectors 39-42 to accommodate and retain the individual springs 44.

As most clearly shown in FIG. 4, the sliding faces of the ratchet teeth 38 of racks 29 and 30 taper inwardly toward each other and forwardly toward the cushioning assembly 8 from laterally aligned straight locking faces. The teeth 43 of individual sectors 39-42 are correspondingly formed and consequently may slide forwardly toward the cushioning assembly 8 upon the sliding surfaces. However, except for very limited rearward movement, the lateral locking faces of the ratchet sector teeth 43 immediately move into engagement with the lateral faces of the triangular rack teeth 38 incident reverse movement of the sectors and the reverse or rearward movement of the sectors is immediately arrested.

The ratchet sectors 39-42 are carried in a common cage assembly which prevents relative longitudinal movement with respect to the racks 29 and 30. The teeth 43 of the individual sectors 39-42 are relatively offset one-quarter of the length of the pitch of the teeth and correspondingly engage the teeth 38 of racks 29 and 30 under the action of springs 44. As shown in FIGS. 4 and 6, with the teeth of the sector 39 in full mating engagement with the teeth of the adjacent rack 29, the teeth of sector 40 are in one-quarter engagement, the teeth of sector 41 are in three-quarter engagement, and the teeth of sector 42 are in one-half engagement. The forward movement of the ratchet sectors 39-42, as a unit, more than one-quarter of the pitch length of the teeth, causes a different one of the sectors 39-42 to move into reverse locking engagement. The sectors 39-42 may thus reciprocate only within one-quarter of the pitch length of the teeth.

Referring particularly to FIGS. 2, 4 and 6, the sectors 39-42 are retained in a common cage assembly including upper and lower restraining plates 46 and 47 which are bolted or otherwise secured at opposite ends of sectors 39-42 to a trailing wall member 48 and to pressure bar 25 to define a channel within which the sectors 39-42 are allowed to move laterally into and out of engagement with the teeth of the ratchet racks 29 and 30. The trailing wall member 48 and the pressure bar 25 include flat end surfaces which are positioned between the plates 46 and 47 and form vertical bearing surfaces for the ratchet sectors 39-42.

The pressure bar 25 projects forwardly toward the cushioning assembly 8 and terminates in the tubular portion 26 which encircles shaft 19 and the lock nuts 22. The end of tubular portion 26 bears upon the collar 23 and thus couples the movable ratchet sectors 39–42 to the collar 23. Generally, at least one of the sectors 39–42 is in full engagement with the adjacent rack 29 or 30 and the full engaging teeth prevent rearward movement of the attached pressure bar 25. Any inward shock movement is transmitted to the cushioning assembly 8 and compresses the heavy cushioning spring 24, as previously described. The force is transmitted from spring 24 through the collar 23 and the pressure bar 25 to the ratchet assembly 28. When the spring 24 is completely compressed, no further inward movement can occur and the abnormal shock forces are transmitted directly to the ratchet assembly and thus to the cutter arm 2.

The ratchet sectors 39–42 are continuously biased forwardly by the relatively light spring 27 as most clearly shown in FIGS. 2 and 4.

A spring retaining shaft 49 threads into a suitably tapped opening in the trailing wall member 48 and projects rearwardly therefrom. A pin 50 extends through aligned openings in shaft 49 and the trailing wall member 48 to prevent unthreading of shaft 49. The trailing end of shaft 49 is journaled within a suitable aperture 51 in the adjacent end brace 37 and is threaded as at 52 to receive a pair of locked nuts 53 disposed outwardly of brace 37. Predetermined movement of the ratchet assembly 28 moves lock nuts 53 into engagement with the end brace 37 and prevents further movement of the ratchet sectors.

The coil spring 27 encircles the shaft 49 and acts between the end brace 37 and the trailing wall member 48. The end brace 37 is stationary and consequently the coil spring 27 tends to expand and force the cage assembly 28, with sectors 39–42, forwardly toward the outer end of the cutter arm 2. This maintains the pressure bar 25 in constant engagement with the collar 23.

Rigid supporting blocks 54 are secured to the mounting frame plates 34 by suitable bolts 55. Braces 56 are secured between the end brace 37 and the rigid supporting blocks 54 by welding or the like to strength the end brace 37 and provide a rigid supporting structure.

The operation and functioning of the illustrated embodiment of the invention is summarized as follows.

Assume that the ratchet assembly 28 is in the illustrated position with the sector 39 in full tooth engagement with the adjacent ratchet rack 29. The straight faces of the corresponding teeth are in locking engagement. The spring 27 is somewhat lighter than spring 24 and cannot therefore force the ratchet sectors 39–42 forwardly to compress the spring 24.

Under normal operating conditions, the cushioning assembly 8 constitutes a shock absorber to take up all horizontal forces on the fork 7. The inward forces act through the fork 7 to compress the spring 24 and to this extent absorb the forces. The forces are transmitted through the collar 23 and pressure bar 25 to the ratchet assembly 28, and thus to the cutter arm 2.

The cushioning effect of spring 24 is controlled by the positioning of the lock nuts 22 to vary the degree of permitted expansion of the spring 24. As shown in FIG. 2, the spring 24 expands to a preselected maximum length with the collar 23 engaged by the lock nuts 22.

The cushioning assembly 8 and attached fork 7 may also reciprocate within the housing 10 to the extent of the one-quarter pitch length of the teeth of the ratchet assembly 28. The spring 27 my thus serve as a light cushion prior to operation of the main cushioning spring 24.

Continued use of the cutter arm 2 inherently results in some wear in the chain 5 which causes the chain to lengthen more than the one-quarter pitch length of the rack teeth. The expansion of spring 24 is limited by lock nuts 22 and consequently cannot take up the slack in this chain 5. However, the spring 27 continuously forces the ratchet assembly 28 outwardly and through movement of stop collar 23 to reposition the cushioning assembly 8 and attached fork 7 outwardly to maintain the tension on the chain 5. The forward motion of the ratchet sectors 39–42 effects successive full engagement of the ratchet teeth to prevent rearward movement of the ratchet cage assembly and coupled cushioning assembly 8 except for the previously described movement between successive teeth engagements. In this manner, the ratchet assembly 28 under the action of the spring 27 continuously repositions the stop collar 23 to maintain the chain taut.

Assume the chain 5 lengthens and moves outwardly from the fork 7. The lighter spring 27 causes the whole cushioning assembly 8 to move forwardly to take up the slack. The ratchet sectors 39–42 slide upon the racks 29 and 30 and move laterally into and out of full engagement. A multi-sector ratchet assembly 28 establishes a relatively small movement with teeth sufficiently large to withstand the shock forces. The normal shock forces are absorbed by the cushioning spring 24 to the extent of the permissible movement of the spring and greater shock forces arising from the chordal action of the chain or from any other purpose are transmitted through the spring 24 to the ratchet assembly 28 and then directly to the cutter arm 2.

The tensioning assembly 9 thus continues to move forwardly to take up all slack in the chain 5 while the cushioning assembly 8 is maintained in a predetermined position and provides a predesigned recoil.

The present invention provides a tensioning and cushioning device which provides a cushion adequate to absorb all normal chain activity but which is locked continuously against any loads due to abnormal cutter stresses. The device provides controlled recoil in the cushioning assembly 8 under all conditions and isolates all excessive recoil occasioned by chain working stresses.

The tensioning and cushioning apparatus of the present invention is particularly adapted to a bottom unloader for a silo and the like. However, it will be equally applicable to any endless driven member which is subject to shock loads and which should be maintained in a constantly taut condition.

The tensioning and cushioning device of the present invention is very rugged and reliable. All of the components are readily manufactured and assembled and the device is readily adapted to mass production methods. Consequently, the device can be produced economically and commercially.

Various modes of carrying out the invention are contemplated as being within the scope of the following claims particularly pointing out and distinctly claiming the subject matter which is regarded as the invention.

I claim:

1. A tensioning and cushioning device for an endless driven member, comprising an expandable housing having a carrier at one end adapted for engaging the driven member and restrained against movement at the opposite end, resilient cushioning means within said housing and coupled to the carrier, means to restrict the compression and expansion of said means, a movable stop for the resilient cushioning means, a ratchet means including a stationary portion secured to the housing and a one-way movable portion coupled to said movable stop, and a resilient tensioning means exerting a lesser force than said resilient cushioning means upon said movable portion, said tensioning means biasing said stop means toward the carrier and repositioning the cushioning means to maintain the endless member taut.

2. A tensioning and cushioning device for an endless driven member, comprising an expandable housing having a movable carrier at one end adapted to support the driven member and being restrained against movement at the opposite end, a shaft means secured to the carrier and projecting inwardly of the housing, a stop movably journaled on the shaft, a recoil spring encircling the shaft between the carrier and the stop and biasing the carrier away from the stop, a ratchet means including a stationary ratchet portion secured to the housing and a movable ratchet portion coupled to said stop, said ratchet means allowing expanding housing movement of said stop and locking against opposite movement of said stop, and a resilient means exerting a lesser force than said spring upon said movable ratchet portion to exert a force upon said stop and reposition said stop and said spring to maintain a controlled recoil.

3. A tensioning and cushioning device for an endless driven member, comprising an expandable housing having a movable carrier secured to one end for movement into resilient engagement with the driven member and being restrained against movement at the opposite end of the carrier, a shaft secured to the carrier and projected inwardly of the housing, lock means secured to the inner end of the shaft, a movable stop encircling the shaft adjacent the lock means, a recoil spring encircling the shaft between the stop and the carrier, a ratchet means including a stationary rack portion secured to the housing and movable ratchet portion, a rigid means secured to the movable ratchet portion and engaging the adjacent surface of said stop, said ratchet means allowing the movable ratchet portion to move toward said stop and locking the movable ratchet portion against opposite movement, and a tension spring coupled to continuously bias said movable ratchet portion toward said stop and to continuously reposition said stop and maintain the driven member taut, said tension spring exerting a lesser force than said recoil spring.

4. A tensioning device for an endless driven member, comprising an expandable housing having a movable carrier for said driven member at one end and restrained against movement at the opposite end, a cushioning means disposed within said housing and exerting an expanding force upon said carrier to absorb shock forces in said driven member, said cushioning means including a movable stop secured within the housing and means connected to the stop to restrict expansion of the cushioning means to maintain a controlled recoil of the cushioning means, a ratchet assembly including a stationary rack secured to the housing and a movable sector coupled to the movable stop, said rack and sector having sliding mating teeth permitting movement of the sector toward the resilient means and preventing reverse movement of the sector, and resilient means biasing said sector toward the stop means to bias the cushioning means and the housing outwardly to thereby take up the slack in the driven member and to maintain said predetermined cushioning means in the same position relative to the end of the endless driven member, said resilient means exerting a smaller force upon said stop means than said cushioning means whereby the cushioning means is fully expanded prior to movement due to the resilient means.

5. A tensioning device for an endless driven member, comprising a housing restrained against movement at one end, a carrier for the driven member having a piston telescoped into the opposite end of the housing, a shaft secured to the piston and projected into the housing, lock means adjustably secured to the inner end of the shaft, a stop journaled on the shaft, a recoil spring encircling the shaft between the stop and the piston, means to prevent rotation of the piston and maintain predetermined positioning of the carrier, said means allowing axial movement of the carrier, a ratchet assembly including a stationary ratchet rack secured to the housing and a series of movable ratchet sectors, said rack and sectors having sliding mating teeth permitting one-way movement of the sectors toward the stop, cage means to support said sectors with the sector teeth of several sectors offset to establish successive full engagement of the several sectors, a tension spring secured to bias the cage means toward the stop and thereby continuously resiliently bias the carrier outwardly of the housing to take up the slack in the driven member, said tension spring exerting a lesser force upon said stop than said recoil spring whereby the recoil spring is fully expanded prior to movement due to the tension spring and a controlled recoil is established for said driven member.

6. A tensioning device for an endless driven member, comprising an expandable housing having a movable carrier for said driven member at one end and restrained against movement at the opposite end, a cushioning means disposed within said housing and exerting an expanding force upon said housing to maintain said driven member in tension, said cushioning means including a movable stop mounted in the outer end of the housing and means connected to the stop to restrict expansion of the housing under the action of the cushioning means, a ratchet assembly including a stationary rack secured to the housing and a series of movable sectors coupled to the movable stop, said rack and sectors having sliding mating teeth permitting movement of the sectors toward the stop and preventing reverse movement of the sector incident full teeth engagement, cage means supporting said sectors for simultaneous movement with the teeth of at least some of the sectors being offset with respect to the rack to create successive full engagement, a shaft secured to the cage means, a tension spring encircling the shaft and biasing the cage means toward the stop to bias the cushioning means outwardly of the housing and thereby take up slack in the driven member, said tension spring exerting a lesser force upon said stop than said cushioning means whereby the cushioning means is fully expanded prior to movement due to the tension spring.

7. A bottom unloader for a storage structure having a rotating cutter arm carrying a chain driven cutter adapted to dislodge and remove stored material, a chain carrier means telescoped into the outer end of the cutter arm, an endless cutter chain supported by the chain carrier means and restricting outward movement of the carrier means, a coil spring within the cutter arm and coupled to the carrier means to bias the carrier means outwardly and to absorb inward movement of the carrier means incident chordal action and shock loads, inward stop means for the chain carrier means, a pair of opposed racks secured to the cutter arm and having facing similar teeth, a series of ratchet sectors mounted between the racks and having teeth adapted to mate with the teeth of said racks, spring means disposed between the ratchet sectors biasing said teeth into mating engagement, cage means holding said ratchet sectors with the sector teeth in varying uniform engagement with the ratchet teeth in accordance with the pitch length of the teeth divided by the number of sectors, means to couple said ratchet sectors to said inward stop means, said ratchet teeth having a mating side at right angles to the line of movement of said sectors to prevent inward movement of the stop means and an angular opposite side permitting outward movement of the stop means, and a coil spring coupled to the ratchet cage to bias the ratchet sectors and the attached stop means outwardly of the cutter arm, said second coil spring being weaker than the first coil spring.

8. An unloader for a storage structure having a rotating cutter arm carrying a cutter adapted to dislodge and remove stored material, a chain cutter means telescoped into the outer end of the cutter arm, an endless cutter chain supported by the chain carrier means and restricting outward movement of the carrier means, a cushion spring disposed within the cutter arm and coupled to the carrier means to bias the carrier means outwardly and to absorb inward movement of the carrier means incident chordal action and shock loads, movable stop means for the coil spring, a pair of horizontally spaced racks secured iln alignment to the bottom wall of the cutter arm and having similar teeth in opposed facing vertical surfaces, a series of ratchet sectors mounted between the racks and having teeth adapted to mate with the teeth of said racks, said teeth having cooperating locking surfaces extending perpendicularly between the ratchet racks and sliding surfaces extending angularly toward the stop means, spring means disposed between the ratchet sectors and biasing said teeth into mating engagement, cage means holding said ratchet sectors with the sector teeth in varying uniform engagement with the rack teeth in accordance with the pitch length of the teeth divided by the number of sectors, means to couple said ratchet sectors to said inward stop means, a shaft secured to the cage means and projected through the cutter arm, a stop wall adjacent the end of the shaft, and a tension spring encircling the shaft and compressed between the cage means and the stop wall to bias the cage means and attached ratchet sectors toward stop means to continuously urge the carrier means arm, said second tension spring being weaker than the cushion spring.

9. An unloader for a storage structure having a rotating cutter arm carrying a chain driven cutter adapted to dislodge and remove stored material, a tubular housing mounted within the outer end of the arm, a chain carrier means having a tubular piston telescoped into the tubular housing, an endless cutter chain supported by the chain carrier means and restricting outward movement of the carrier means, said housing and piston each having diametrically opposite aligned slots, the slots in one of the housing and the piston having a slightly greater circumferential dimension and a substantially greater axial dimension than said other slots, a pin wedge in said other slots and terminating in said other slots to allow relative axial movement of the piston and to prevent rotation of the piston, a shaft secured to the inner end of the piston and extending inwardly within the housing, a stop movably journaled on said shaft and bearing on said stop nuts, a coil spring encircling the shaft between the piston and the stop to bias the carrier means outwardly and to absorb inward movement of the carrier means incident chordal action and shock loads, a pair of horizontally spaced opposed racks secured to the cutter arm inwardly of said housing and having similar aligned teeth defined by rear transverse surfaces and forwardly extending angular surfaces, a series of ratchet sectors mounted between the racks and having teeth adapted to mate with the teeth of said racks, resilient means oppositely biasing said sectors to force the sector teeth into mating engagement with the rack teeth, a cage holding said ratchet sectors with the sector teeth in varying uniform engagement with the ratchet teeth in accordance with the pitch length of the teeth divided by the number of sectors, said cage including forward and rearward bearing members, said forward bearing member extending into said housing and being recessed to embrace the inner end of the shaft and stop nuts and to bear against the stop, a tension shaft secured to the rearward bearing member and extending inwardly therefrom, a bearing wall in said cutter arm having an aperture to accommodate the tension shaft, and a coil spring encircling the tension shaft and acting between the bearing wall and the rearward bearing member to bias the cage and into engagement with the movable stop to bias the chain carrier outwardly of the cutter arm, said tension spring being weaker than the cushioning spring.

10. An unloader for a storage structure having a rotating cutter arm carrying a chain driven cutter adapted to dislodge and remove stored material, a tubular housing mounted within the outer end of the arm, a chain carrier means having a piston telescoped into the tubular housing, an endless cutter chain supported by the chain carrier means and restricting outward movement of the carrier means, a diametrical opening in the piston, said housing having diametrically opposite slots aligned with said opening, said slots having a slightly greater circumferential dimension and a substantially greater axial dimension than said opening, a pin wedge in said opening and terminating in said slots to allow relative axial movement of the piston and to prevent rotation of the piston, a shaft secured to the inner end of the piston and extending inwardly within the housing, stop nuts secured to the inner end of the shaft, a movable stop journaled on said shaft and bearing on said stop nuts, a coil spring encircling the shaft between the piston and movable stop to bias the carrier means outwardly and to absorb inward movement of the carrier means incident chordal action and shock loads, a pair of horizontally spaced opposed racks secured to the cutter arm inwardly of said housing and having similar aligned teeth defined by rear transverse surfaces and forwardly extending angular surfaces, a series of ratchet sectors mounted between the racks and having similarly formed teeth adapted to mate with the teeth of said racks, a plurality of coil springs mounted in aligned recesses in the ratchet sectors and oppositely transversely biasing said sectors to force the teeth into mating engagement, a cage holding said ratchet sectors with the sector teeth in varying uniform engagement with the ratchet teeth in accordance with the pitch length of the teeth divided by the number of sectors, said cage including upper and lower walls and forward and rearward bearing members, said forward bearing member extending into said housing and being recessed to embrace the inner end of the shaft and stop nuts and to bear against the movable stop, a tension shaft secured to the rearward bearing member and extending therefrom, a bearing wall in said cutter arm having an aperture to accommodate the tension shaft, a coil spring encircling the tension shaft and acting between the bearing wall and the rearward bearing member to bias the cage and into engagement with the movable stop to bias the chain carrier outwardly of the cutter arm, said tension spring being weaker than the cushioning spring, and stop means secured to the end of the tension shaft and adapted to engage the bearing wall after a determined outward movement of the cage.

References Cited in the file of this patent

UNITED STATES PATENTS

| | | |
|---|---|---|
| 1,806,901 | Hawley | May 26, 1931 |
| 2,612,988 | Andrews | Oct. 7, 1952 |
| 2,702,485 | Nadherny | Feb. 22, 1955 |
| 2,764,031 | Nystrom | Sept. 25, 1956 |
| 2,887,342 | Helsel | May 19, 1959 |

FOREIGN PATENTS

| | | |
|---|---|---|
| 958,070 | Germany | Feb. 14, 1957 |